LE ROY WILLOUR AND C. O. ROBERTS.
POWER DISTRIBUTING ATTACHMENT FOR AUTOMOBILES.
APPLICATION FILED JUNE 17, 1918.

1,322,986.

Patented Nov. 25, 1919.
3 SHEETS—SHEET 1.

Inventor
LeRoy Willour
C. O. Roberts
C. H. Parker  Attorney

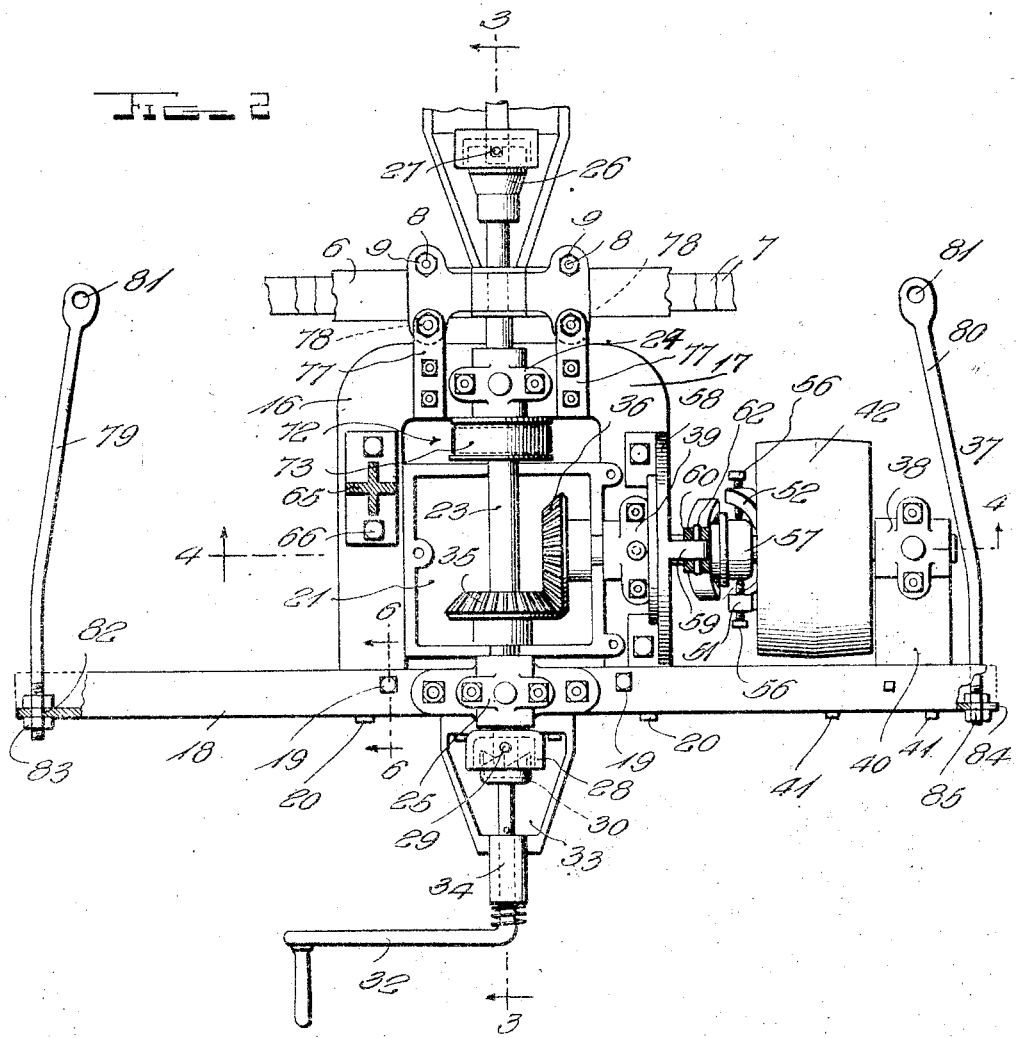

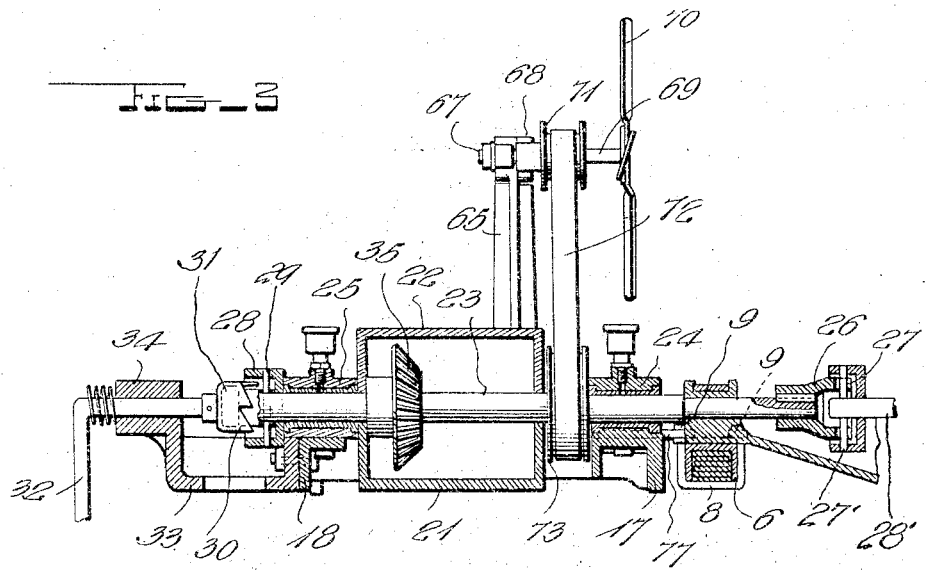
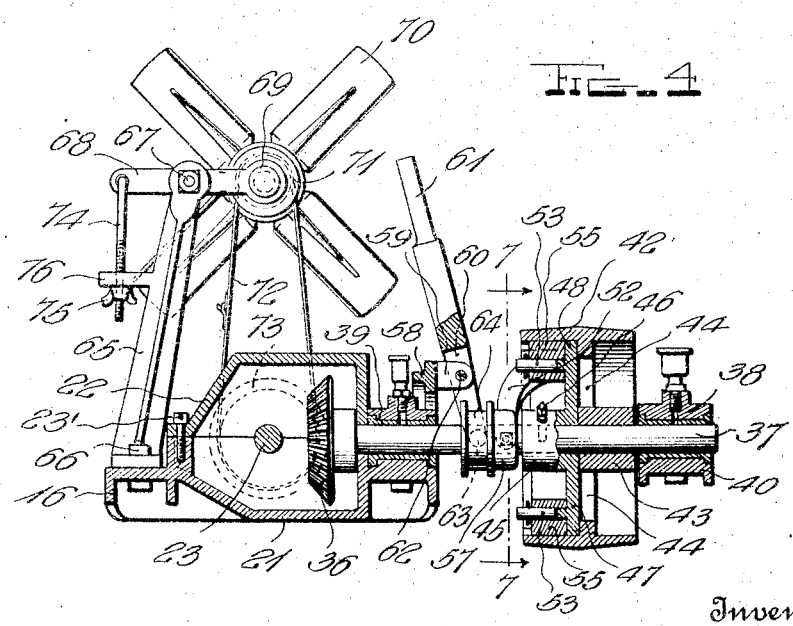

UNITED STATES PATENT OFFICE.

LE ROY WILLOUR AND CHARLES OLIVER ROBERTS, OF ASHLAND, OHIO.

POWER-DISTRIBUTING ATTACHMENT FOR AUTOMOBILES.

1,322,986.   Specification of Letters Patent.   Patented Nov. 25, 1919.

Application filed June 17, 1919. Serial No. 240,502.

*To all whom it may concern:*

Be it known that we, LE ROY WILLOUR and CHARLES O. ROBERTS, citizens of the United States, residing at Ashland, in the county of Ashland and State of Ohio, have invented certain new and useful Improvements in Power-Distributing Attachments for Automobiles, of which the following is a specification.

Our invention relates to power distributing attachments, for automobiles.

An important object of the invention is to provide an attachment of the above mentioned character, adapted to be used in connection with a Ford automobile, and having connection with the forward end of the crank shaft of the engine, to be driven thereby, while not necessarily restricted to this use.

A further object of the invention is to provide means of the above mentioned character, which may be securely attached to the Ford automobile, by utilizing the bolts of the same, without the employment of additional bolts or attaching means.

A further object of the invention is to provide an attachment of the above mentioned character, so constructed that its operating parts may be maintained thoroughly lubricated.

A further object of the invention is to provide an attachment of the above mentioned character, which is simple in construction, strong, and durable.

Other objects and advantages of the invention will be apparent during the course of the following description.

Figure 1:
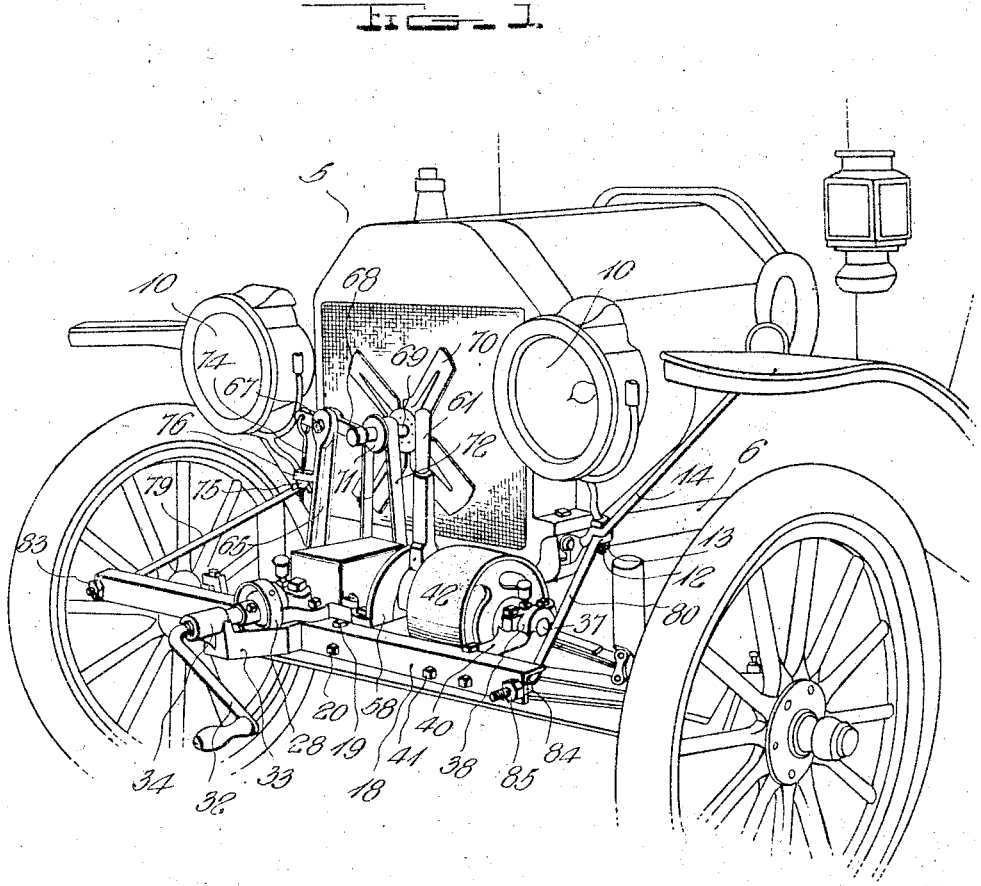
Figure 7:
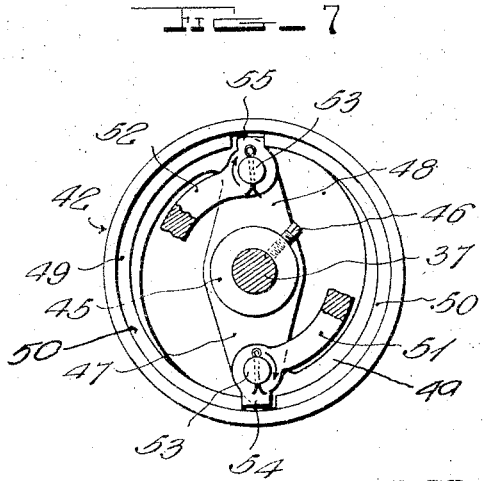

In the accompanying drawings forming a part of this specification and in which like numerals are employed to designate like parts throughout the same, Figure 1 is a perspective view of apparatus embodying our invention, showing the same attached to the forward end of a Ford automobile, Fig. 2 is a plan view of the attachment removed from the automobile, Fig. 3 is a vertical longitudinal sectional view taken on line 3—3 of Fig. 2, Fig. 4 is a vertical transverse sectional view taken on line 4—4 of Fig. 2, Fig. 5 is a detail section through the lamp bracket and associated elements, Fig. 6 is a detail section taken on line 6—6 of Fig. 2, and Fig. 7 is a detail section taken on line 7—7 of Fig. 4.

In the drawings, wherein for the purpose of illustration is shown a preferred embodiment of our invention, the numeral 5 designates a Ford automobile, as a whole, embodying a frame or chassis 6, supported at its forward end by a transverse leaf spring 7, clamped thereto by U-shaped bolts 8. These U-bolts carry nuts 9. The numeral 10 designates head lights or lamps of the automobile, secured to arms 11, provided at their lower ends with bolts 12, as clearly shown in Fig. 5. These bolts carry nuts 13. The bolts 12 pass through apertures in fender arms 14, rigidly secured to the chassis 6, as is well known.

Our attachment comprises a U-shaped body portion or casting 16, which is horizontally arranged with its closed or transverse end 17 disposed rearwardly. The forward ends of the U-shaped member 16, as clearly shown in Fig. 6, extend beneath and contact with a transverse rail 18, which is L-shaped in cross-section. This rail 18 is rigidly secured to the forward ends of the U-shaped member 16 by bolts 19 and 20. The U-shaped member 16 has a gear casing section 21 arranged therein and cast integral therewith. The numeral 22 designates a coacting gear casing section which is secured to the casing section 21 by bolts 23' or the like, and forms with the same a closed gear casing adapted to receive grease, whereby the gears arranged therein, operate in the grease.

Extending longitudinally of the U-shaped member 16 is a driving shaft 23, journaled through bearings 24 and 25. The bearing 24 is rigidly secured to the transverse end 17 of the U-shaped member, while the bearing 25 is rigidly secured to the rail 18, as shown. The driving shaft 23 extends longitudinally through the gear casing.

At its rear end, the driving shaft 23 carries a clutch element 26, rigidly secured thereto, and this clutch element embodies a tubular head having transverse slots 27, for the reception of the transverse pin or coacting clutch element 27' secured to the forward end of the crank shaft 28' of the engine. At its forward end, the driving shaft 23 has a tubular clutch element 28 rigidly secured thereto, provided with a pin 29, to engage coacting ratchet teeth 30 formed upon a clutch element 31. This clutch element is rigidly secured to a crank 32, which is the crank removed from the Ford automobile. The numeral 33 designates a crank bracket, bolted or otherwise rigidly secured to the transverse rail 18 and carrying a bearing 34 for the reception of the crank 32, as is shown. The crank 32 may be employed in the usual manner for cranking or starting the engine and will be automatically disconnected from the driving shaft 23, when the engine is started.

A bevel gear 35 is rigidly secured upon the driving shaft 23 and permanently engages a bevel gear 36 disposed at a right angle thereto. The bevel gear 36 is rigidly secured upon a transverse shaft 37 which is journaled through bearings 38 and 39. The bearing 38 is rigidly secured to an arm 40, bolted to the rail 18, as shown at 41, while the bearing 39 is rigidly secured to the U-shaped member 16.

The numeral 42 designates a power distributing pulley, comprising a hub 43, and spokes 44. The hub 43 is loosely mounted upon the transverse shaft 37. Means are provided to lock and unlock the pulley 42 with and from the transverse shaft 37, comprising a hub 45, which is clamped to the shaft 37 by a bolt 46 or the like. The hub 45 carries radially extending arms or spokes 47 and 48 (see Fig. 7). The arms 47 and 48 carry curved clamping members 49 and 50 respectively, preferably formed integral therewith, and which are slightly resilient and are capable of being forced outwardly in clamping engagement with the inner periphery of the pulley 42. The free ends of the members 49 and 50 have no connection with said arms. The numerals 51 and 52 designates spreaders, which are pivoted upon the arms 47 and 48 respectively, as shown at 53. These spreaders have radial extensions 54 and 55, to contact with the free ends of the members 50 and 49 respectively. The free ends of the spreaders 51 and 52 as more clearly shown in Fig. 2, carry radially extending bolts 56, to contact with a cone 57, which is loose upon the transverse shaft 37. When the cone 57 is shifted to the right as indicated in Fig. 2, the spreaders 51 and 52 move apart and thereby are swung upon their pivots 53 and cause the elements 50 and 49 to lock the pulley 42 to the shaft 37.

An inverted U-shaped bracket 58 is rigidly secured to the U-shaped member 16, and carries a lateral extension 59. This lateral extension is inserted between the arms 60 of the forked end of a shifting lever 61, the arms 60 being pivoted to the extension 59, as shown at 62. The arms 60 carry at their free ends, inwardly projecting extensions 63, loosely mounted within an annular groove 64, formed upon the cone 57.

It is obvious that by shifting the lever 61 upon its pivot the cone 57 will be shifted. It is to be understood that the invention is in no sense restricted to the particular type of clutch and pulley construction herewith shown and described, as other forms may be employed with some degree of success.

We provide means for creating additional air currents through the radiator of the engine, the same comprising a fan arm or bracket 65, bolted or otherwise rigidly secured to the U-shaped member 16, as shown at 66. The arm 65 is approximately vertically arranged and has pivotal connection at its upper end, as shown at 67, with a vertically swinging lever 68. Pivoted to the inner end of the lever 67 is a fan shaft 69, having a fan 70 rigidly secured thereto. This fan shaft has a pulley 71 rigidly secured thereto, engaged by a belt 72, extending downwardly to engage a pulley 73, rigidly secured to the driving shaft 23. The belt 72 is maintained suitably tight by means of a screw-threaded rod 74, pivoted to the outer end of the lever 68, and having a thumb nut 75, screwed thereon and contacting with a lug 76 cast integral with the arm 65.

Secured to the transverse end 17 of the U-shaped member are metal straps 77, having apertures 78 formed in their rear ends. These apertures receive the upper ends of the U-bolts 8, the nuts 9 having been removed. When the nuts 9 are subsequently screwed upon the U-bolts 8 the straps 77 are accordingly clamped to the spring 7. The numerals 79 and 80 designate diagonal brace rods, provided at their rear ends with apertured heads 81, for the reception of the bolts 12 of the lamp arms 11, as shown in Fig. 5. The nuts 13 are of course removed and the heads 81 inserted upon the bolts 12 subsequent to which the nuts 13 are screwed up, to clamp the heads 81 in place. The forward end of the brace rod 79 extends through an aperture 82 in the vertical web of the rail 18 and is clamped to the vertical web by nuts 83. The opposite end of the vertical web is provided with a longitudinal slot 84, receiving the forward end of the brace rod 80, the brace rod being clamped in this slot by nuts 85. The slot 84 provides a connection whereby, after the device is attached to the automobile, the rod 80 may be disconnected from the rail 18 and swung to a position to permit of the belt (not shown) being placed upon the pulley 42, subsequently to which the brace rod 80 is again clamped to the vertical web of the rail 18. It is obvious that the straps 77 and brace rods 79 and 80 will rigidly secure the apparatus to the chassis of the automobile.

The operation of the apparatus is as follows:

When the apparatus is attached to the automobile, as indicated in Fig. 1, the crank 32 may be employed to start the engine, in the customary manner. When the engine is started, the pulley 42 being normally idle, the lever 61 may be swung to the left and this movement of the lever will shift the cone 57 to the right and lock the pulley 42 with the transverse shaft 37. The power is distributed from the pulley 42 as is obvious. The fan 70 receives its rotation from the shaft 23 through the medium of the belt 72 and associated elements.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:

1. In an attachment of the character described, a transverse rail adapted to be disposed forwardly of and near an automobile, a U-shaped member having its transverse end arranged rearmost and its free ends secured to the rail, a closed gear casing arranged within and secured to the U-shaped member, a longitudinal driving shaft, bearings secured to the transverse end and the rail and having the longitudinal shaft journaled therein, a transverse shaft arranged near the longitudinal shaft, bearings for the transverse shaft connected with the U-shaped member and rail, bevel gears secured to the longitudinal and transverse shafts and operating within the closed gear casing, a power distributing pulley connected with the transverse shaft to be driven thereby, means for connecting said transverse end with a relatively stationary part of the automobile, and means for connecting the end portions of the rail with relatively stationary parts of the automobile.

2. In an attachment of the character described, a transverse rail adapted to be disposed forwardly of and near an automobile, a U-shaped member having its transverse end arranged rearmost and its free ends secured to the rail with the rail projecting laterally beyond the free ends for a substantial distance, a longitudinal driving shaft, bearings for the longitudinal driving shaft secured to the transverse end and rail, a transverse shaft arranged near the longitudinal shaft, bearings for the transverse shaft connected with one longitudinal arm of the U-shaped member and the rail, bevel gears secured to the longitudinal and transverse shafts and operating within the closed gear casing, a power distributing pulley loosely mounted upon the transverse shaft, a clutch device arranged within the pulley and adapted to lock the same to the transverse shaft, means for connecting the rear end of the longitudinal shaft with the crank shaft of the engine, means for connecting the transverse end with the U-bolts of the front spring of the automobile, and rods secured to the ends of the rail and having their rear ends apertured for receiving bolts carried by the lamp arms.

3. In an attachment of the character described, a transverse rail adapted to be disposed forwardly of a Ford automobile, an open frame having its forward end connected with the rail extending laterally beyond the frame for a substantial distance, a gear casing arranged within and secured to the open frame, a longitudinal driving shaft, bearings for the longitudinal driving shaft secured to the rear end of the open frame and the rail, a transverse shaft, bearings for the transverse shaft secured to the open frame and rail, gearing connecting the longitudinal and transverse shafts and arranged within the gear casing, a power distributing pulley carried by the transverse shaft, straps secured to the rear end of the open frame and apertured for receiving the U-bolts of the front spring of the automobile, and rods secured to the ends of the rail and provided at their rear ends with apertured heads for receiving the bolts carried by the forward lamp arms.

4. In an attachment of the character described, a transverse rail adapted to be disposed forwardly of and near an automobile, a U-shaped member having its transverse end arranged rearmost and its free ends secured to the rail with the rail projecting laterally beyond the same for a substantial distance, a longitudinal driving shaft carried by the U-shaped member and rail, a transverse shaft carried by the U-shaped member and rail, gearing serving to connect the shafts and arranged within the U-shaped member, means connecting the rear end of the longitudinal shaft with the crank shaft of the engine, apertured attaching elements secured to the transverse end of the U-shaped member and adapted to receive the U-bolts of the front spring of the automobile, rods secured to the ends of the rail and having their rear ends provided with apertured heads to receive the bolts of the front lamp arms, and a power distributing pulley arranged upon the transverse shaft.

5. In an attachment of the character described, a transverse rail to be disposed forwardly of an automobile, a U-shaped member having longitudinal arms the forward ends of which are secured to the rail, a longitudinal driving shaft carried by the U-shaped member and rail, a transverse shaft carried by the U-shaped member and rail, gearing connecting the longitudinal and transverse shafts and arranged within the U-shaped member, a power distributing pulley carried by the transverse shaft, a support bracket secured to one longitudinal arm of the U-shaped member, means to throw the pulley into action including a lever pivoted upon the support bracket, an upstanding fan support secured to the other longitudinal arm of the U-shaped member, a fan rotatable upon the upstanding support, driving connecting means between the fan and the longitudinal shaft, means for connecting the longitudinal shaft and the crank shaft of the engine, means to manually turn the longitudinal shaft, and means to attach the U-shaped member and rail to the automobile.

6. In a power attachment for automobiles, a frame adapted to be secured to the front of an automobile, an extension shaft journaled in said frame in alinement with the power shaft of the automobile and adapted to be secured thereto, a fan support secured to the frame and extending upwardly therefrom, a fan mounted for rotation in said support in front of the radiator and adapted to direct a current of air thereagainst, means for communicating motion from the extension shaft to the fan to operate the same, a power distributing pulley, a rotary element disposed within the pulley adapted to be rotated upon the rotation of the extension shaft, and manually operative means for connecting the pulley and said rotary element whereby the pulley will be actuated by and rotated with such element.

In testimony whereof we affix our signatures in presence of two witnesses.

LE ROY WILLOUR.
CHARLES OLIVER ROBERTS.

Witnesses:
J. W. GARDNER,
J. I. CURRY.